United States Patent Office 3,285,678
Patented Nov. 15, 1966

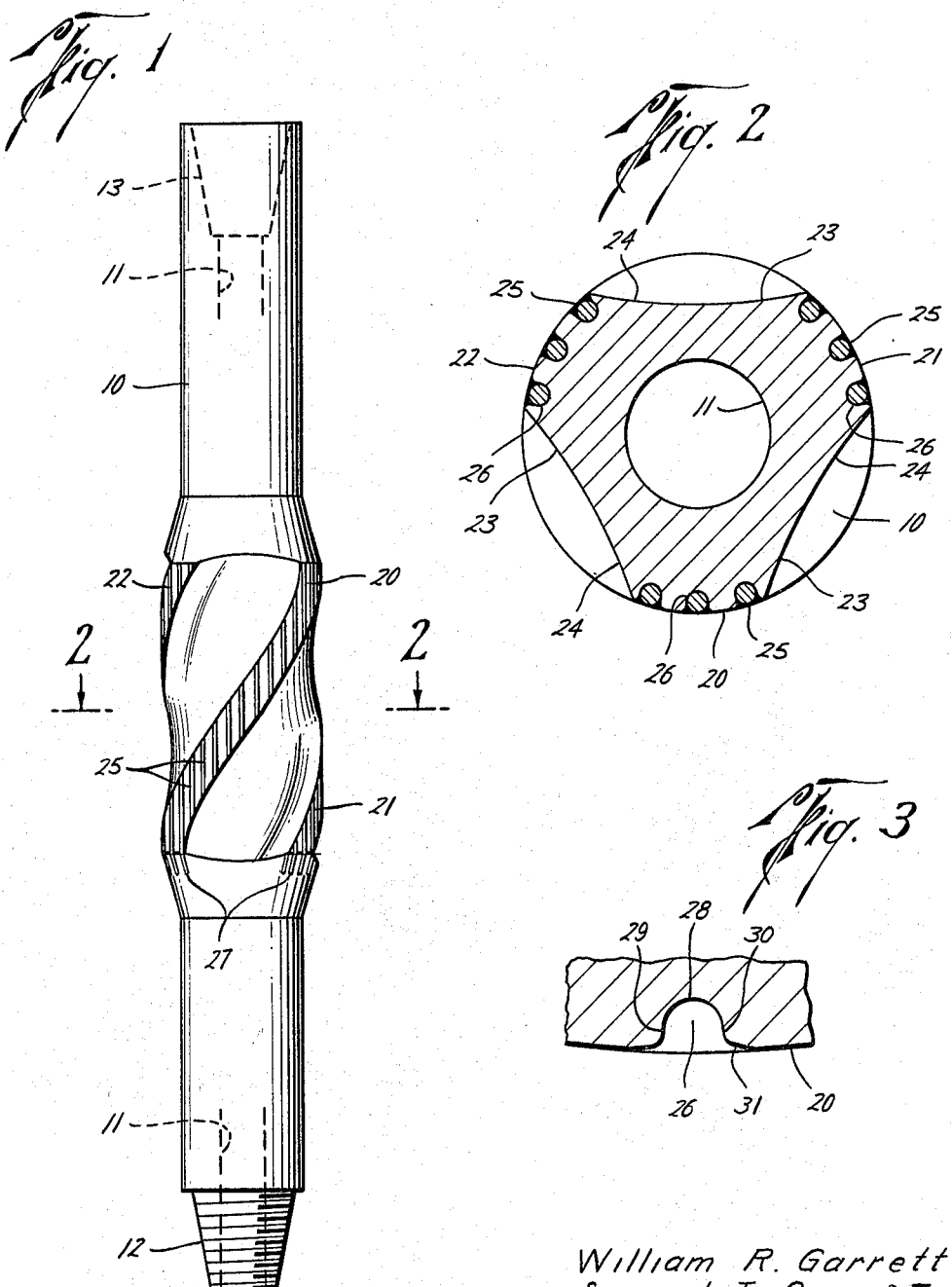

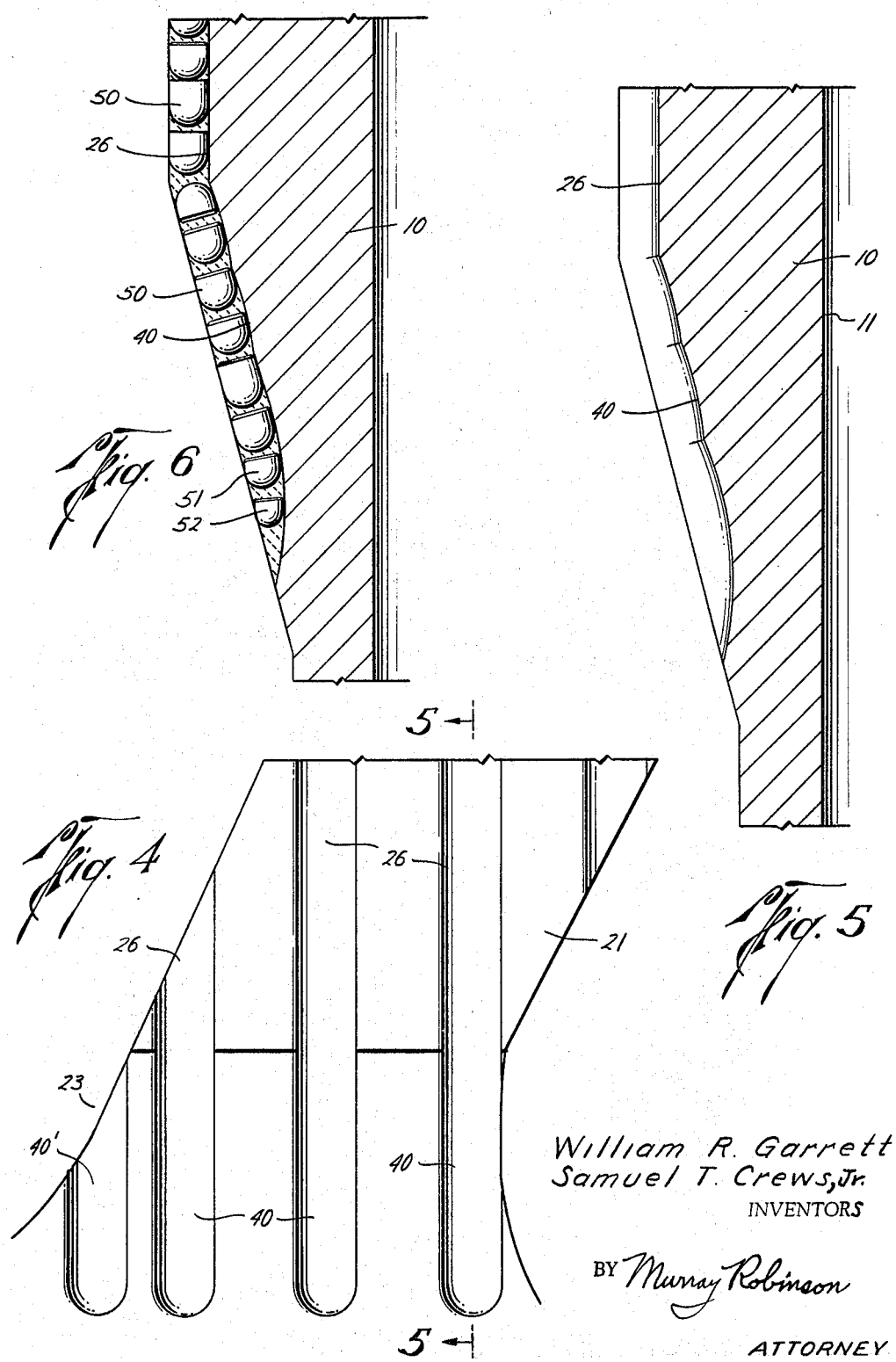

3,285,678
DRILL COLLAR STABILIZER
William R. Garrett and Samuel T. Crews, Jr., Midland, Tex., assignors to Drilco Oil Tool, Inc., Midland, Tex., a corporation of Texas
Filed Jan. 13, 1964, Ser. No. 337,393
5 Claims. (Cl. 308—4)

This invention pertains to an integral blade stabilizer, useful in maintaining a string of drill collars concentric with the hole being bored in the rotary system of earth boring.

It has long been recognized that integral blade stabilizers are superior to stabilizers with welded-on blades in that the welded-on blades are apt to be knocked off during use. On the other hand, the cost of using integral blade stabilizers has been high because once the blades are worn down the entire stabilizer must be discarded, whereas with welded-on blades, the body can be retained when the blades are worn out, and new blades welded on to the old body.

The above mentioned difficulty with integral blade stabilizers is not overcome with known hard facing techniques heretofore used on circular cross-section drilling equipment such as tool joints. If deep hard facing is to be used one has a choice among tool joint hard facing constructions of using small tungsten carbide particles which must be welded in place at high cost, or using short tungsten carbide cylinders set in individual bored radial holes, or an inlay of tungsten carbide tiles which require specially shaped pieces. If long cylindrical rods are used set parallel to the axis of the tool being protected, tungsten carbide cannot be used because of the difference in temperature coefficient of expansion compared to steel which will break any bond between the rod and tool. If a thin layer of hard facing is used, when the thin layer of hard facing wears off the blades too rapidly become greatly undersized before the loss of hard facing is discovered, following which the whole stabilizer must be discarded or converted to the welded-on blade type.

The invention overcomes the aforementioned difficulties by providing deep hard facing of tungsten carbide in an economical and satisfactory way. With deep hard facing, the stabilizer will not suddenly deteriorate rapidly as soon as the blades have worn down a small amount, as is the case with thin hard facing. It will be understood from the foregoing that by deep hard facing is meant hard facing that has a depth considerably in excess of the maximum permissible wear on the blades. Therefore, when the stabilizer has worn down to the maximum permissible amount, it can be removed from use and returned to the shop for repair and reuse.

According to the invention, deep hard facing at reasonable cost is provided by forming a plurality of elongated grooves in the peripheral surfaces of the stabilizer blades. Similar grooves are provided at the lower ends of the blades. Into the grooves are placed a series of tungsten carbide spheres or short cylinders or similar shapes whose maximum dimensions are of the same order of magnitude as the widths of the grooves, say not in excess of twice such width. Tungsten carbide bodies of this size may be referred to as pellets, as distinct from rods, which are of greater length, and as distinct from granules or rough irregularly shaped particles. The tungsten carbide pellets, if spherical, will have a diameter equal substantially to the depth of the groove. Cylindrical pellets would have a diameter substantially equal to the depth of the groove and would be placed with their axes parallel to the length of the groove. The groove width is only slightly larger than the diameter of the spherical or cylindrical pellets so as to allow same to be placed in the groove. Each pellet is either in contact with its immediate neighbors or closely adjacent thereto, both of which relationships may be described by the term contiguous. The pellets are brazed in place, for example with nickel silver.

The term brazing as here used includes the joining of two bodies by means of a metal which is brought to a liquid state by heating but in which the two bodies that are joined are not sufficiently heated to reach the liquid stage. As thus defined, the term encompasses a variety of procedures which may be in some cases called hard soldering. A brazing material having a melting temperature of at least 1,100 degrees F. and up to 2,000 degrees F. is contemplated. For example, silver solder, copper-tin-zinc alloys, and nickel-silver may fall in this category of brazing materials.

A further problem is encountered in deep hard facing of integral blade stabilizers in that the side walls of the grooves in which the beds of hard facing are placed are subject to cracking during cooling subsequent to brazing the hard facing in place. The stabilizer blades are made of the same material as the body and in order for the tool to have a reasonable life the body and blades are made of steel that can be hardened. As here used, hardenable steel means steel that can be hardened by heating to a temperature above the critical temperature range in which ferrite changes to austenite and then quenching. A carbon steel having in excess of 0.30% carbon is hardenable in this sense. Since the temperature at which the brazing operation is carried on will usually bring the steel to a temperature above the critical point, the hardenable steel used for the blades of the stabilizer will be likely to crack adjacent the sides of the grooves when it cools following brazing.

According to the invention the integral blades of the stabilizer are preferably disposed at an angle to the axis of the tool, that is, they will be helical, and the grooves in which the beds of hard facing will be placed are longitudinal and hence transverse to the blades. This makes it possible to space the grooves laterally from each other, a distance in excess of the groove width, thus leaving ample material to form the sides of the grooves. In turn, this makes it possible to round the outer peripheral edges of the sides of the grooves without completely eliminating the portion of full gage diameter of in between the grooves. The ample spacing of the grooves and the rounding of the edges of the groove side walls makes it possible to braze the deep hard facing in the hardenable steel blades without the blades cracking adjacent the groove walls during cooling.

To insure adequate protection of the stabilizer, the grooves in the helical blades are spaced close enough together to insure longitudinal overlapping of the grooves, that is, each groove extends longitudinally beyond the upper end of the adjacent groove at one side thereof and the lower end of the adjacent groove at the other side thereof. To this end and at the same time to insure adequate groove spacing to provide sufficient wall strengh, the blades should have a substantial helix angle. However, to avoid swabbing action on removal of the stabilizer from a well bore, it is desirable that the helix angle not be too great, whereby fluid can flow past the stabilizer between the blades without having to deviate too much from a straight path parallel to the axis of the stabilizer, and whereby rocks and other detritus can fall through between blades without having to circle too far around the stabilizer. In a sense, the helix angle should not exceed the angle of repose. Within the foregoing limitations, it is a further desideratum that the blades overlap azimuthally whereby when the stabilizer is pulled from the well bore without rotation, there will be full wall contact rather than grooving.

For a detailed description of a preferred embodiment of the invention reference will now be made to the accompanying drawings wherein:

FIGURE 1 is a side elevation of a drill collar stabilizer embodying the invention;

FIGURE 2 is a section taken at 2—2 of FIGURE 1;

FIGURE 3 is an enlarged view of a portion of the section of FIGURE 2, showing the cross-section through a groove for the hard facing, but prior to placement of the hard facing;

FIGURE 4 is an enlarged view of a portion of the elevation of FIGURE 1 showing the hard facing grooves at the bottom of a blade, but with the hard facing not yet in place;

FIGURE 5 is a section taken at 5—5 of FIGURE 4;

FIGURE 6 is a view similar to FIGURE 5 but with the hard facing in place.

Referring now to FIGURES 1 and 2, there is shown a stabilizer comprising a tubular body 10 having an axial passage 11 therethrough. At the lower end of the body there is provided means in the form of a threaded pin 12 for connection to a drill collar or other part of a string of drill collars. At the upper end of the body there is provided means in the form of a threaded box 13 for connection to a drill collar or other part of a string of drill collars. The box 13 will normally have an outer diameter of the same size as the drill collars with which it is used.

In between the upper and lower ends of the body there are formed a plurality of helical blades, integral with the tubular body. For example, the body and blades may be milled from an upset drop forging. An A.S.T.M. 4145 carbon steel is suitable both from the forging standpoint and later on to avoid cracks during cooling following the brazing operation.

The blades 20, 21, 22 are helical with their ends slightly overlapping azimuthally. For example, each blade may extend 130 degrees around the axis of the stabilizer. The blades are of full hole (bit) diameter and, hence, do a certain amount of reaming as well as stabilizing. They prevent the formation of excessive wall cake. The sides 23, 24 of each adjacent pair of blades slope gradually toward the body, merging together as a slightly concave surface of circular arcuate section.

Extending longitudinally across the outer peripheral surface of each blade 20, 21, 22 are a plurality of elongated beds 25 of hard facing laid in grooves 26, with the upper end of each bed overlapping longitudinally the lower end of the bed next above in the same blade. This prevents undercutting and grooving of the blades in between the beds of hard facing. At the lower ends of the blades there are provided inclined beds 27 protecting the blades from undercutting at their lower ends. Preferably, each bed 27 is a continuation of a bed 25 on the peripheral surface of the blade, being laid in a groove 40 that is a continuation of a groove 26. Since the maximum permissible wear of the stabilizer is about ¼ inch measured on a radius, at which time the stabilizer is too undergauge to be of full value, the depth of each bed is preferably twice that great or ½". Beds of such depth provide what has been described above as deep hard facing.

Referring now to FIGURE 3, there is shown a cross section through a portion of one of the blades showing a cross section through a groove 26 therein and the continuation groove 40 prior to placement of the hard facing bed in the groove. The groove 26 has a bottom 28 of circular arcuate cross section of about 180 degrees extent joining parallel side walls 29, 30 extending to the top of the groove. The upper edges of the groove are rounded and relieved below the adjacent peripheral surface of the blade as shown at 30, 31. Groove 40 is of similar shape to groove 26 but tapers off at its lower end.

Referring now to FIGURE 4, there is shown in elevation a fragment of one of the blades 21 prior to placement of the hard facing therein and illustrating the grooves 26 and 40. The spacing of the grooves, measured on the peripheral surface of the blade, exceeds the width of the groove by about 50%, except in the case of the grooves 40 in the end surface of the blade. Most of the latter are continuations of grooves 26 and, hence, similarly spaced, but on the bottom of the leading edge 23 of each blade (considering clockwise rotation) there is squeezed in an additional groove 40' close to the neighboring groove 40.

It is to be noted that because the blades are helical and the grooves are longitudinal and, hence, transverse to the blades, any desired groove spacing can be used as may be needed to provide strength and prevent cracking. This would not be the case if the grooves ran the same way as the blades, either with both longitudinal or both helical, where the spacing would be limited by the width of the blade which in turn is limited by the need for adequate fluid passages formed by the spaces between the blades.

Referring now to FIGURE 5 there is shown a longitudinal section through one of the stabilizer blades prior to placement of the hard facing beds on the blades and showing a groove 26 merging with a groove 40. It will be seen that groove 40 is of gradually decreasing depth at the lowermost part thereof where the blade joins the body 10. Referring to FIGURE 6, there is shown the same grooves 26, 40 with the tungsten carbide pellets 50 in place therein. At the shallow part of groove 40 a few pellets 51, 52 of small diameter are used in order that they not protrude out of the groove. It is preferred that all of the pellets be of such size that they extend from the bottom of the groove to a height substantially flush with the top of the groove.

The manufacture of the tool may be as follows: A generally cylindrical forging with center upset is bored axially and the outer peripheries of the ends are turned concentric to the axial bore. The upset center portion of the body is milled to form helical grooves leaving helical blades 20, 21, 22 therebetween. The blades are milled to form the grooves 26, 40. The body is preheated to 400 degrees F. and the tungsten carbide pellets are brazed into the grooves using, for example, a "Marquette" No. 38 (fluxed Rod) or No. 39 (Bare Rod) nickel silver brazing rod. The blade peripheries are then ground with a hand grinder until they pass a ring gauge of the desired diameter, for example, a $9^{13}/_{16}$ inch ring gage for a stabilizer to be used in a 9⅞ inch diameter bore hole. The body is then magnetically inspected for cracks. Finally, the connection means at the ends are machined. The tungsten carbide pellets used may be scrap pellets recovered from cutting tools such as rotary reamers, thereby lowering their cost. Although reference has been made hereinabove solely to tungsten carbide pellets, other cemented metal carbides could also be used such as titanium carbide and chromium carbide, as well as a variety of alloys of the metal carbides with such materials as cobalt, nickel, and with other carbides, e.g. columbium carbide, tantalum carbide. These materials may be made by a variety of methods. For example, casting or powder metallurgy. In accordance with the latter method, powdered carbide may be produced by heating together powdered metal (or oxide) and carbon. The powdered carbide and a minor percentage, for example 10%, of powdered binder metal are then mixed, pressed together, and sintered. All of the materials of this class, usually having a hardness of about 90±3, more or less, on the Rockwell A scale, are suitable for the pellets used in making the deep hard facing beds in accordance with the invention. This class of materials will be referred to in the claims simply as tungsten carbide, since almost all of these have some percentage of tungsten carbide therein.

While a preferred embodiment of the invention has been shown and described, and certain variations thereof discussed, many other modifications thereof can be made by one skilled in the art while still employing the essence of the invention set forth in the following claims.

We claim:
1. A drill collar stabilizer comprising
   a generally tubular body,
   means at each end of the body for connecting the body in a drill string,
   a plurality of helical blades integral with the outer periphery of said body extending radially ouwardly therefrom,
   each of said blades having a plurality of beds of deep hard facing in the outer peripheral surface thereof extending transversely thereacross,
   said beds being formed by a plurality of grooves in the outer peripheries of the blades extending longitudinally relative to the stabilizer body and circumferentially spaced apart,
   each groove extending longitudinally beyond the upper end of the adjacent groove at one side thereof and the lower end of the adjacent groove at the other side thereof,
   each said groove being filled flush with a plurality of contiguous tungsten carbide pellets held in place by brazing material.

2. Combination according to claim 1 in which at the lower end of each blade there are a plurality of longitudinally extending beds of hard facing similar to those at the outer periphery of each blade and forming continuations thereof and a further similar bed of hard facing at the lower end of each blade displaced azimuthally in the direction corresponding to downward progression of the helix from the other beds on the lower end of the blade.

3. Combination according to claim 1 in which the surfaces of the pellets are surfaces of revolution, and the pellets are set with an axis of revolution parallel to the length of the groove and with their maximum diameters close to the groove width.

4. Combination according to claim 1 in which the body is made of hardenable steel, the outer peripheral edges of the sides of the grooves are rounded, and the melting temperature of the brazing material used to hold the pellets in place exceeds the critical point temperature of the steel at which the ferrite begins to change to austenite.

5. Combination according to claim 1 in which the blades overlap each other azimuthally and the grooves are spaced apart in excess of the groove width.

References Cited by the Examiner

UNITED STATES PATENTS

| | | | |
|---|---|---|---|
| 2,657,907 | 11/1953 | Cochran | 209—4 |
| 2,838,121 | 6/1958 | Coyle | 166—173 |
| 3,054,647 | 9/1962 | Von Rosenberg | 308—4 |
| 3,058,524 | 10/1962 | Tripplehorn | 166—178 |
| 2,667,930 | 2/1965 | Saurenman | 166—173 |

DAVID J. WILLIAMOWSKY, *Primary Examiner.*

L. L. JOHNSON, *Assistant Examiner.*